(12) United States Patent
Pacholec et al.

(10) Patent No.: US 7,653,648 B2
(45) Date of Patent: Jan. 26, 2010

(54) PERMISSIONS USING A NAMESPACE

(75) Inventors: Michael A Pacholec, Sammamish, WA (US); Michael I Torres, Seattle, WA (US); Apurva F Dalia, Kirkland, WA (US); Matthew S Augustine, Seattle, WA (US); Mukeshkumar M Beher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/123,857

(22) Filed: May 6, 2005

(65) Prior Publication Data

US 2006/0253456 A1 Nov. 9, 2006

(51) Int. Cl.
*G06F 17/00* (2006.01)

(52) U.S. Cl. .......... 707/102; 707/100; 707/101
(58) Field of Classification Search .......... 707/1, 707/10, 100–102; 709/223; 705/51, 1
See application file for complete search history.

(56) References Cited

U.S. PATENT DOCUMENTS

| 5,918,222 A * | 6/1999 | Fukui et al. .......... 707/1 |
| 7,035,825 B1 * | 4/2006 | Sturtevant et al. .......... 705/51 |
| 2003/0110246 A1 * | 6/2003 | Byrne et al. .......... 709/223 |

* cited by examiner

*Primary Examiner*—Sana Al-Hashemi

(57) ABSTRACT

Permissions using a namespace is described. In an embodiment, a namespace system includes a network resource that has a resource permission, and includes a namespace that has one or more members associated with the namespace. The namespace system also includes a namespace permission to permission the network resource to one or more of the members of the namespace.

12 Claims, 11 Drawing Sheets

PERMISSIONS USING A NAMESPACE

TECHNICAL FIELD

This invention relates to network resource permissions.

BACKGROUND

Users of computers and various other electronic and computing devices access, manage, store, and share many types of data, such as documents, calendars, phone numbers, addresses, email messages, personal information, digital photographs, and the like. These and other types of data can be maintained with a personal or portable computer, with various hand-held devices such as a personal digital assistant or cell phone, and/or by way of an on-line data service and/or network managed storage facility via a network, such as an intranet or the Internet.

A namespace can be provisioned as a data structure to collectively reference and organize the various types of data in an individual or private namespace associated with an individual user, or in a group namespace associated with designated members of the namespace. For example, a Web site can be implemented or set-up so that only designated members can access data associated with the Web site. Typically, a Web site is created to provide unrestricted access to the Web site and/or associated Web page(s) for only the designated members of a group, and limit access to any other networked users. Similarly, an individual user can implement an individual resource (e.g., a photo album or personal blog) either on-line at a networked data service, or locally with a personal computing device.

SUMMARY

Permissions using a namespace is described herein.

In an embodiment of permissions using a namespace, a namespace system includes a network resource that has a resource permission, and includes a namespace that has one or more members associated with the namespace. The namespace system also includes a namespace permission to permission the network resource to one or more of the members of the namespace.

BRIEF DESCRIPTION OF THE DRAWINGS

The same numbers are used throughout the drawings to reference like features and components.

DETAILED DESCRIPTION

Permissions using a namespace is described in which embodiments enable defining and resolving the role of a requestor on a network resource when a resource is permissioned to a namespace which may be a complex set of members and/or their relationships. Permissions using a namespace provides the ability to share information and data between networked users, dynamic lists, and/or various groups, circles, and social networks. Different services and resources can be assigned to a namespace, different members can be assigned to the namespace, and different levels of permissions can be assigned to the namespace, designated members, and/or associated resources.

A namespace can include namespace permissions and references to other namespaces to allow additional namespaces and/or members of an additional namespace access to data, resources, and/or services referenced within the namespace. Permissions using a namespace also enables object level permissioning to allow a Web page to have components that have different permission levels, where the permission granularity can be extended to any data, resource, service, or members of a namespace, or across namespaces.

While aspects of the described systems and methods for permissions using a namespace can be implemented in any number of different computing systems, environments, and/or configurations, embodiments of permissions using a namespace are described in the context of the following exemplary system architectures.

Figure 1:
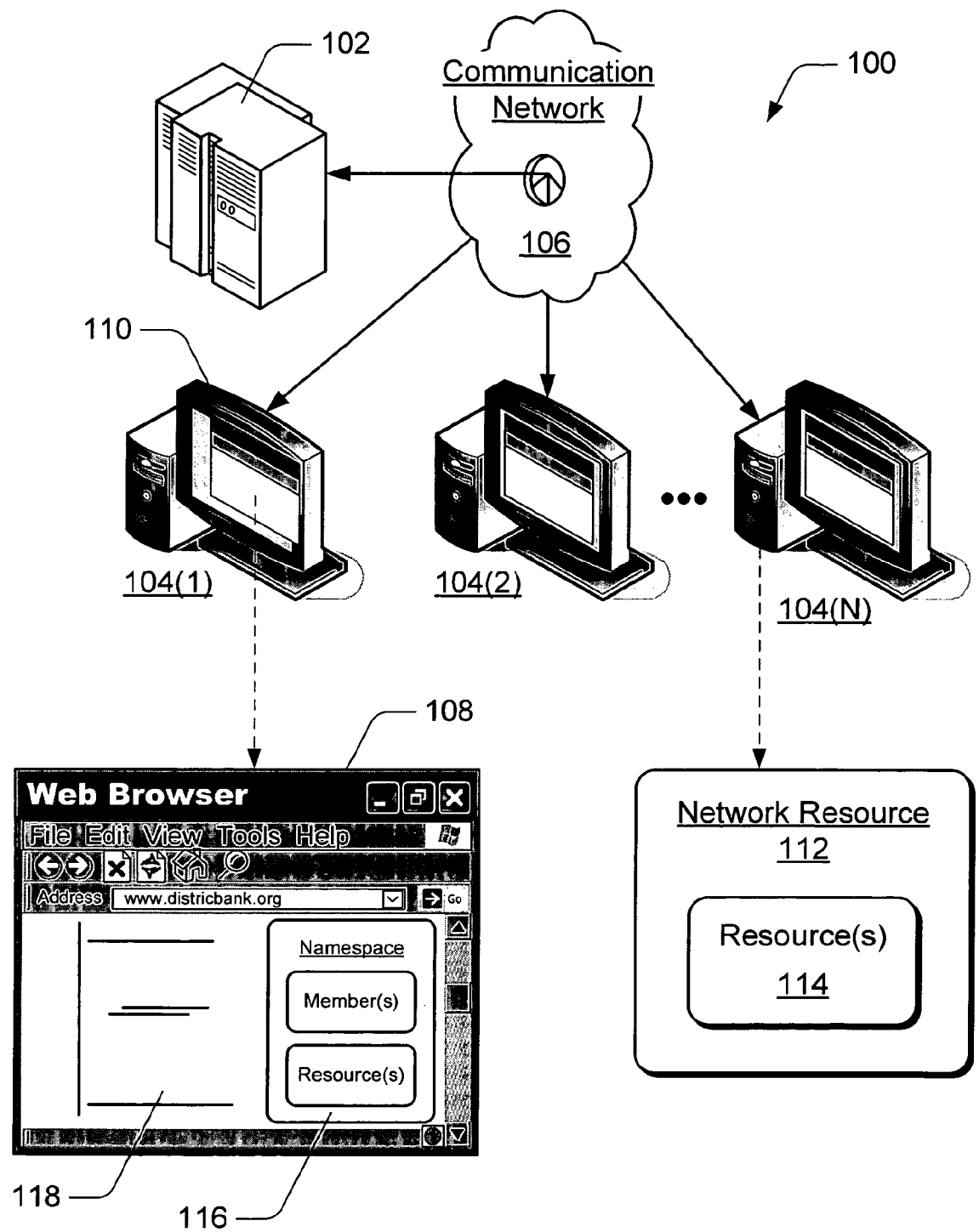
FIG. 1 illustrates an exemplary network system in which embodiments of permissions using a namespace can be implemented.

FIG. 1 illustrates an exemplary network system 100 in which embodiments of permissions using a namespace can be implemented. The network system 100 includes any number of server device(s) 102 and any number of client and/or computing devices 104(1-N) each configured for communication via a communication network 106, such as an intranet or the Internet. A computing and/or server device may be implemented as any form of computing or electronic device with any number and combination of differing components as described below with reference to the exemplary computing device 1000 shown in FIG. 10, and with reference to the exemplary computing environment 1100 shown in FIG. 11.

In an implementation of the exemplary network system 100, any one or more of the computing devices 104(1-N) can implement various Web browsing application(s) to facilitate Web browsing and/or to generate a Web browser user interface 108 for display on a display device (e.g., display device 110 of client device 104(1)). The Web browser user interface 108 facilitates user interaction with other computer users at any of the computing devices 104(1-N) and/or with any other device(s) 102 via the communication network 106.

The system 100 can include any number of other computing device(s), such as server device(s) 102, that can be connected through the communication network 106 (e.g., the Internet) to any number of the client and/or computing devices 104(1-N). In this example, a server device 102 can be implemented as an on-line Web service, an on-line data service, and/or as a network managed storage facility via which a user at a computing device 104 can access, manage, store, and/or share services, resources, data, and the like.

A significant amount of on-line data and resources is not publicly accessible, but rather is owned by or permissioned to individuals, one or more groups of individuals, and/or groups of groups. Common examples of resources, services, and data include documents, calendars, phone numbers, addresses, email messages, personal information, a photo album of digital photographs, a message board, a guestbook, a music playlist, an instant messaging list of contacts, a social network, a blog, a profile, and the like. In addition to data and resource access permissions, a namespace can include a function permissioned to select members of the namespace, such as to designate those members having permission to call an individual on his or her cell phone.

In an embodiment of permissions using a namespace, a network resource 112 can be implemented as any form of a resource and/or namespace implemented at any networked computer 104 or device 102. In this example, the network resource 112 may include other permissioned resources 114 (to include the common examples of resources, services, and data as described above). The network resource 112 can be implemented as a group namespace at a server device 102 such that designated members of the namespace are permissioned access to data, services, and/or the resources 114 referenced in the group namespace. Alternatively, network resource 112 can be implemented as an individual namespace either via an on-line service at a server device 102 or at a computing device 104.

In various embodiments of permissions using a namespace, different resources can be permissioned to a namespace, different members can be assigned to the namespace, and different levels of permissions can be assigned to the namespace, members, and/or resources. For example, different levels of permissions can be designated for the resources 114 associated with network resource 112 such that different members of a namespace may have different access permissions to the resources 116. For example, a network resource may be set-up for a social group (or social network) and the network resource may be or include a calendar that members of the group refer to for upcoming events of the social group. While all of the designated members of a network resource may be permissioned to view the calendar, only a couple of the designated members may be permissioned to contribute and edit the calendar for the rest of the group.

Individual member resource permissions and different levels of permissions within a namespace are described in greater detail in U.S. patent application Ser. No. 10/877,343, entitled "Using Web Services for Online Permissions" filed Jun. 25, 2004, the disclosure of which is incorporated by reference herein for the purpose of implementing permissions using a namespace.

In various other embodiments of permissions using a namespace, a network resource 112 can be implemented as a namespace object and/or as a component 116 of a Web page 118 that enables object level permissioning to allow different permission levels for components of Web pages. For example, network resource 112 can be implemented as a namespace object and/or as the component 116 of Web page 118 which is maintained at a server device 102 and displayed via the Web browser 108 at a computing device 104. A namespace object can be created in a database that also contains reference links to the resources that define permission access for members, resources, services, and roles of the particular namespace.

Figure 2:
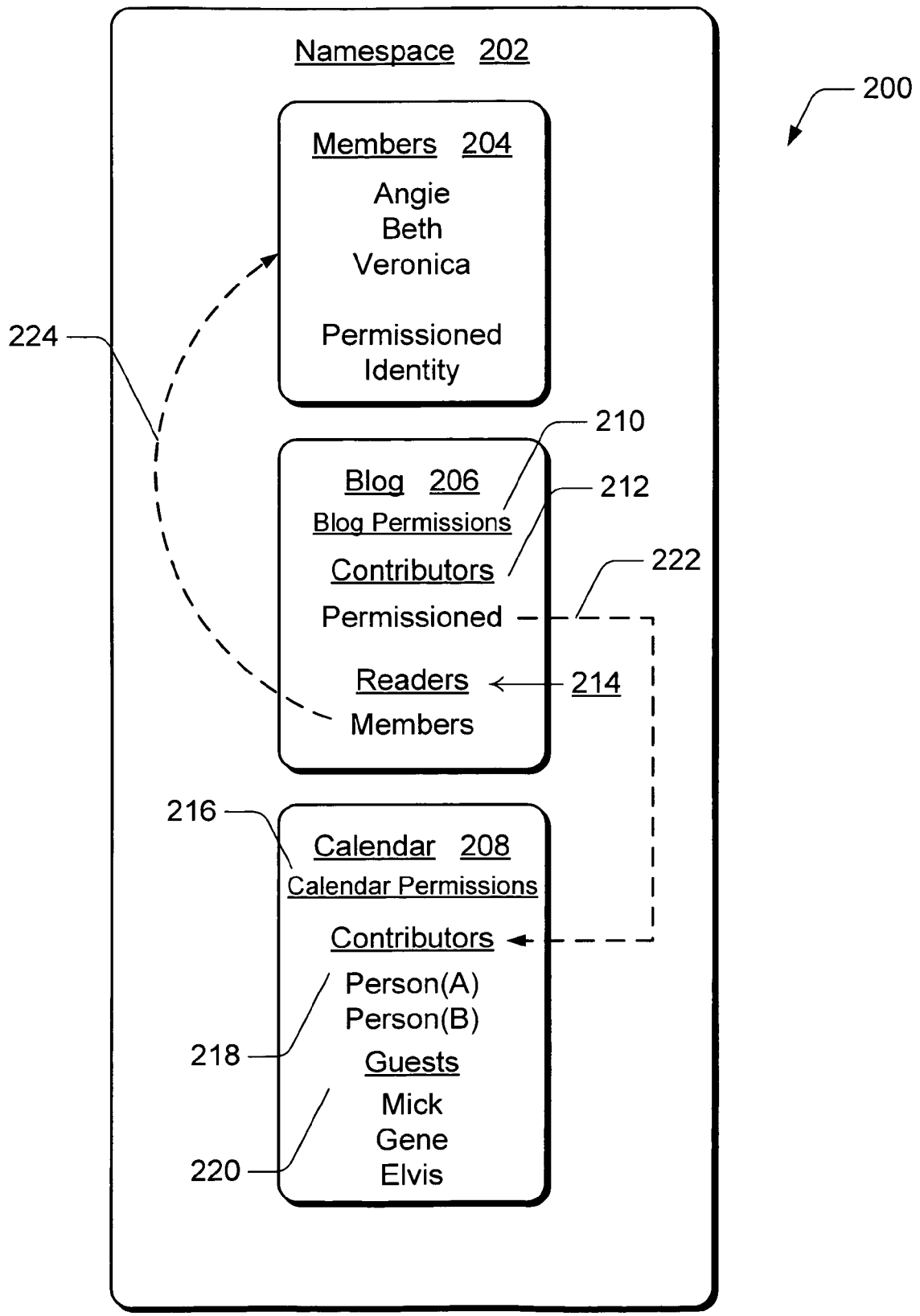
FIG. 2 illustrates an exemplary namespace that includes referenced and nested permissions, and in which embodiments of permissions using a namespace can be implemented.

FIG. 2 illustrates an example 200 of referenced and nested permissions within an exemplary namespace 202, and in which embodiments of permissions using a namespace can be implemented. In one example, namespace 202 can be set-up or initiated as a personal namespace by an individual user, either via an on-line service at a server device 102, or with a computing device 104 as shown in FIG. 1. Namespace 202 includes members 204 which can be other individuals designated by the user associated with namespace 202. The designated members 204 may be contacts (e.g., "buddies" or "friends") that are permissioned access to data, services, and/or resources associated with the namespace. In this example, the members 204 also include a permissioned identity (or permissioned identities) which may be an individual, another namespace, a device, and/or contact(s) which may also be commonly referred to in other systems as "friends", "buddies", "IM (instant messaging) contacts", or as any other type of social identifier that indicates a social network association within the context of a namespace or namespaces.

In this example, namespace 202 also includes a blog 206 (also commonly referred to as a "Weblog") that can be associated with a user or users of the namespace 202. The blog 206 is a resource of the namespace 202 and can be an on-line journal updated by a user of the namespace 202. Additionally, namespace 202 can include any type of data, resources, and services as described above with reference to system 100 shown in FIG. 1. In this example, the namespace 202 includes a calendar resource 208 which may be a social calendar of the user or users associated with namespace 202, or may be an on-line service-based calendar set-up such that the user(s) and/or the designated members 204 can keep each other apprised of their schedules.

A namespace resource can include permissions that designate roles associated with the resource. In this example, the blog 206 includes resource permissions 210 which are designated as a "Contributors" role 212 and as a "Readers" role 214. As the roles 212 and 214 indicate, contributors 212 may have permission to access and add, or contribute, to blog entries, while the readers 214 may only have permission to read the blog 206. Additionally, the calendar resource 208 includes calendar permissions 216 which are designated as a "Contributors" role 218 and as a "Guests" role 220. As the roles 218 and 220 indicate, contributors 218 may have permission to access and add, or contribute, to calendar entries, while the guests 220 may only have permission to view the calendar 208.

A user that sets-up, or initiates, a namespace would typically have to individually designate each member of the namespace and each associated individual having access to their blog and/or other services and resources of the namespace. Namespace 202, however, illustrates an example of referenced and nested permissions within the namespace. In this example, a nested permission 220 designates that the contributors 218 of the calendar resource 208 are also permissioned as contributors 212 of the blog resource 206.

The user associated with namespace 202 need only designate the permissioned identity (or permissioned identities) in the members 204, and then reference the members 204 to permission other services and resources of namespace 202, rather than having to individually designate the members of each service and resource. For example, the blog readers 214 are permissioned from the namespace membership 204 via the referenced permission 224.

Figure 3:
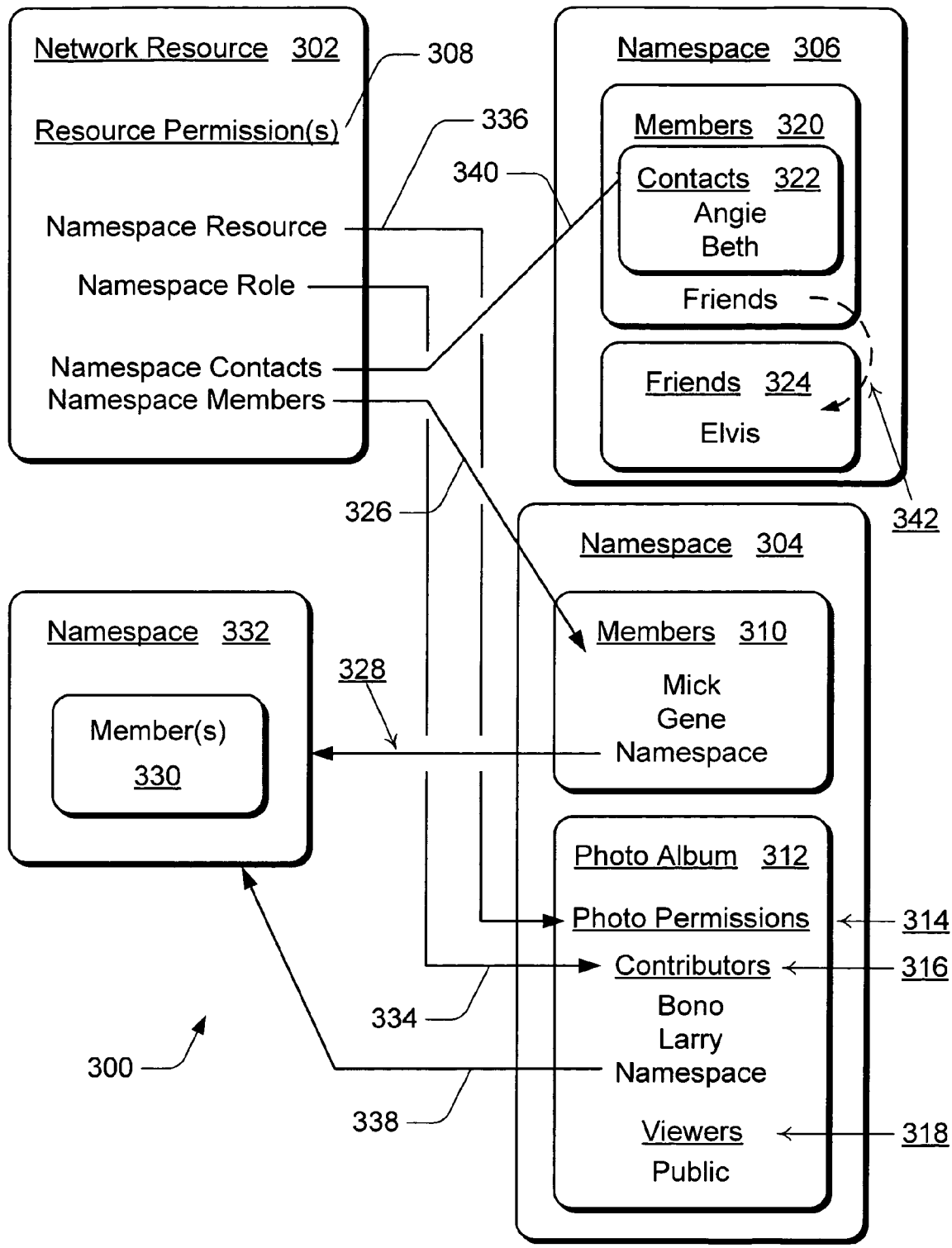
FIG. 3 illustrates an exemplary social network in which embodiments of permissions using a namespace can be implemented.

FIG. 3 illustrates an exemplary namespace network 300 in which embodiments of permissions using a namespace can be implemented. The namespace network 300 includes a network resource 302, a first namespace 304, and a second namespace 306. In this example, the first namespace 304 can be implemented as a group namespace and the second namespace 306 can be implemented as an individual namespace. The network resource 302 can be implemented at any networked computer or device, such as a server device 102 or a computing device 104 shown in FIG. 1. The network resource 302 can be any type of resource as described above that includes resource permission(s) 308. Although not shown, the network resource 302 can also include permissioned roles associated with the resource and that have designated access permission levels.

Each namespace 304 and 306 can also be implemented and maintained on a computing device, such as in the network system 100 shown in FIG. 1. For example, namespace 304 may be implemented as a group namespace and accessed at a server device 102. Similarly, namespace 306 may be implemented as an individual namespace at a computing device 104. The network resource 302, and each namespace 304 and 306, can be accessed via a communication network (e.g., communication network 106 shown in FIG. 1) that connects each associated computing device corresponding to a namespace.

Namespace 304 includes designated members 310 and a resource which is a photo album 312 permissioned to namespace 304. The photo album resource 312 includes permissions 314 and roles that, in this example, are designated as a "Contributors" role 316 and a "Viewers" role 318. As the roles 316 and 318 indicate, contributors 316 may have permission to access and add photos to the photo album 312, while viewers 318 may only have permission to view the pictures in the photo album 312. Any of the namespaces described herein can have various associated membership that includes any one or more of members, contacts, buddies, friends, IM (instant messaging) contacts, or any other type of entity. For example, membership associated with namespace 304 can include the members 310, the permissioned role members 316 and 318, and/or any other entities associated with namespace 304. Namespace 306 includes designated members 320 and a subset of the members identified as "contacts" 322 in this example. The namespace 306 also includes "friends" 324 which are also designated as a subset of members 320.

In various embodiments of permissions using a namespace, the members, services, resources, permissions, and roles in a namespace can be permissioned to any network resource. Additionally, any one or more of the same in one namespace can be permissioned to another namespace, such as namespaces 304 and 306. Only a few of the many possible permissions using a namespace are described with reference to FIG. 3. Additionally, the namespace permissions described herein are references that permission a resource, data, and/or a service and, as a referred to permission changes, a namespace permission automatically changes the permissions on the referencing resource.

A namespace permission can be a group membership permission to permission all of the members of a namespace for access to a resource. For example, namespace permission 326 can be implemented as a group membership permission that permissions all of the members 310 of namespace 304 to the network resource 302. A member of a namespace can be an individual and/or other namespace members, another namespace, or a reference to a namespace service, resource designation, and the like. Namespace permission 326 can also be implemented to permission a subset of the members 310 of namespace 304, or a subset of the membership of namespace 304.

For example, the designated members 310 of namespace 304 includes another namespace permission 328 that permissions members 330 of an additional namespace 332 such that the members 330 of the additional namespace 332 have access to the network resource 302 via the namespace permission 326. The network resource 302 includes a resource role permission 334 that permissions the contributors of the photo album resource 312 in namespace 304 to the network resource 302. The network resource 302 also includes a resource permission 336 that permissions the contributors and the viewers of the photo album resource 312 to the network resource 302. Additionally, the resource role 316 includes a namespace permission 338 that also permissions members 330 of the additional namespace 332 such that the members 330 of the additional namespace 332 have access to the photo album resource 312 and to the network resource 302 via the namespace permission 326.

A namespace permission can also reference a namespace such that members and/or membership of the namespace are permissioned to access a network resource, another namespace, and/or a service. For example, namespace permission 340 permissions the designated members 320 of namespace 306 to the network resource 302. In this example, the designated members 320 of namespace 306 also includes a permission reference 342 that permissions friends 324 which are a subset of the members 320 of namespace 306. The friends 324 are permissioned to the network resource 302 via the individual namespace permission 340.

In each of these examples for permissions using a namespace, additional members added to a namespace, or to a service or resource referenced within or permissioned to a namespace, will inherit the permissions that have been granted to that namespace, service, or resource via the various namespace permissions and references. Additionally, a user that establishes a namespace permission to another group or individual namespace, for example, can set a limit or designate the level of sequenced referenced permissions. For example, the user can establish that only two sequence levels of permissions be allowed such that members are permissioned access to the network resource 302 via the namespace permission 326 (i.e., a first level) and via the namespace permission 328 (i.e., the second level).

Figure 4:
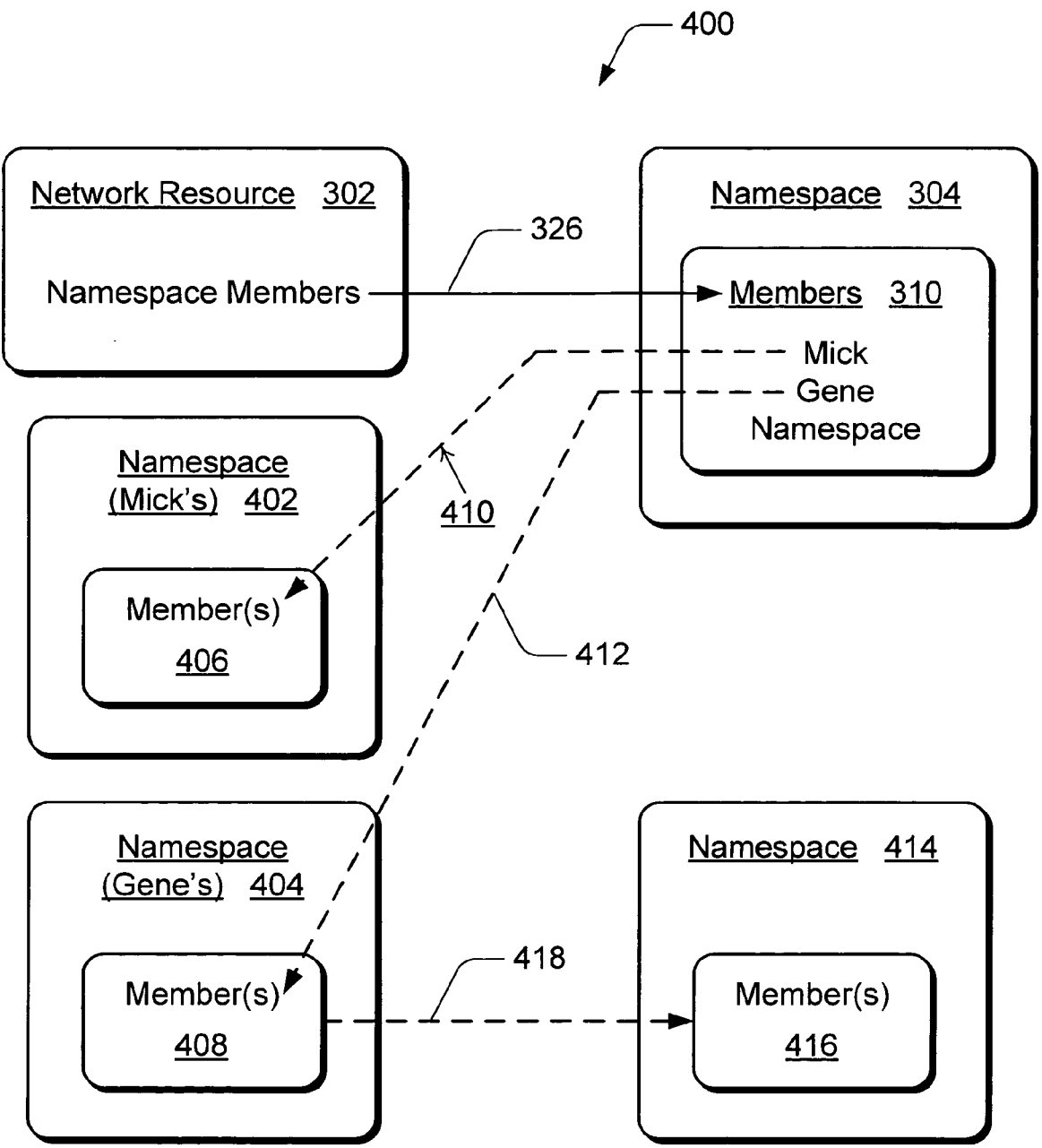
FIG. 4 illustrates an example of inferred relationships in an embodiment of permissions using a namespace.

FIG. 4 illustrates an example 400 of inferred relationships in an embodiment of permissions using a namespace and is described with further reference to the various items shown in FIG. 3. In this example, the network resource 302 is permissioned to the members 310 of namespace 304 via namespace permission 326 (as described above with reference to FIG. 3). The members 310 of namespace 304 include two individuals, Mick and Gene. The example 400 also includes personal namespaces 402 and 404, which are associated with Mick and Gene, respectively.

Each personal namespace 402 and 404 includes respective memberships 406 and 408. By an inferred relationship 410, the members 406 associated with namespace 402 (i.e., Mick's namespace) are permissioned to network resource 302 via the namespace permission 326 and the inferred relationship. Similarly, the members 408 associated with namespace 404

(i.e., Gene's namespace) are permissioned to network resource 302 via the namespace permission 326 and an inferred relationship 412.

In this example, an additional namespace 414 includes memberships 416 which are permissioned to network resource 302 via an inferred relationship 418, the inferred relationship 412, and the namespace permission 326. The inferred relationships 412 and 418 represent two degrees of separation (e.g., from namespace 304). For example, the network resource 302 is permissioned to the members 310 of namespace 304 via namespace permission 326, the members 408 of namespace 404 are permissioned to access the network resource 302 via the inferred relationship 412 (i.e., a first degree of separation), and the members 416 of namespace 414 are permissioned to access the network resource via the inferred relationship 418 (i.e., a second degree of separation).

Methods for permissions using a namespace, such as exemplary methods 500-900 described with reference to respective FIGS. 5-9, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
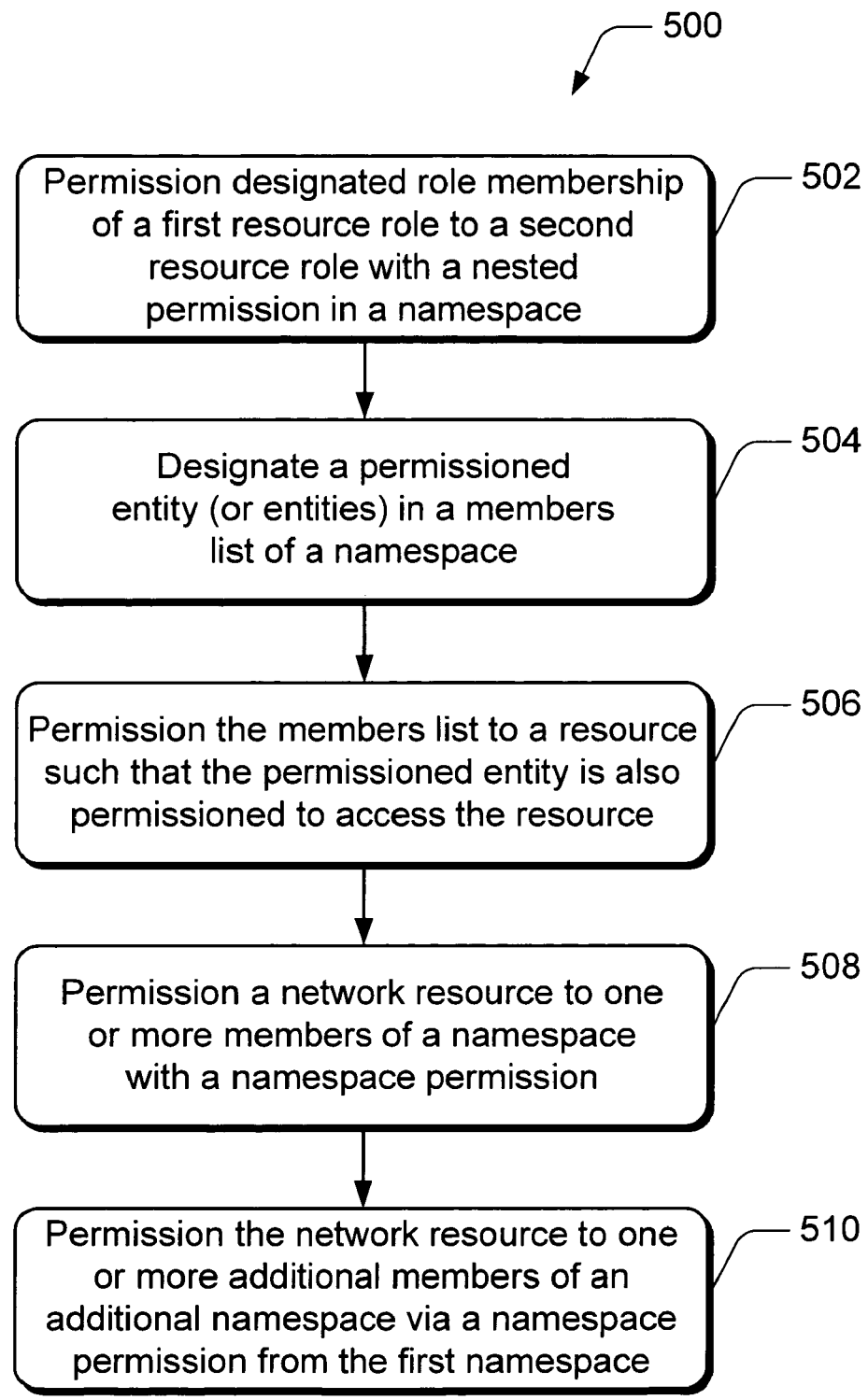
FIG. 5 is a flow diagram that illustrates an exemplary method for permissions using a namespace.

FIG. 5 illustrates an exemplary method 500 for permissions using a namespace. The order in which the method is described is not intended to be construed as a limitation, and any number of the described method blocks can be combined in any order to implement the method. Furthermore, the method can be implemented in any suitable hardware, software, firmware, or combination thereof.

At block 502, designated role memberships of a first resource role are permissioned to a second resource role with a nested permission in a namespace. For example, in namespace 202 (FIG. 2), the calendar resource 208 includes a contributors role 218 with designated role membership (e.g., Persons A and B) that are permissioned to the contributors role 212 of the blog resource 206 with nested permission 222.

At block 504, a permissioned identity (or identities) associated with a namespace are designated in a members list of a namespace. For example, the members 204 of namespace 202 includes a permissioned identity which may be an individual, another namespace, a device, and/or contact(s) permissioned to the namespace 202. At block 506, the members list is permissioned to the resource such that the permissioned identity is also permissioned to access the resource. For example, the members 204 are permissioned access to a role 214 of the blog resource 206 via the namespace permission 224.

At block 508, a network resource is permissioned to one or more members of a namespace with a namespace permission. For example, network resource 302 (FIG. 3) is permissioned to members 310 of namespace 304 via the namespace permission 326. In various embodiments of permissions using a namespace, the network resource 302 is permissioned to the members 310 of namespace 304 via namespace permission 326, permissioned to the namespace 332 via the sequence of namespace permissions 326 and 328, permissioned to a resource role 316 in the namespace 304 via namespace permission 334, permissioned to a resource permissions 314 in the namespace 304 via namespace permission 336, permissioned to members 320 of a namespace 306 via namespace permission 340, and permissioned to the friends subset 324 in namespace 306 via the sequence of namespace permissions 340 and 342. In any number of various embodiments of permissions using namespaces, a network resource can be permissioned to a namespace, members of the namespace, resources and services of the namespace, resource permissions, and/or resource roles within the namespace.

At block 510, the network resource is permissioned to one or more additional members of an additional namespace via a namespace permission from the first namespace. For example, the network resource 302 is permissioned to the members 330 of namespace 332 via the sequence of namespace permissions 326 and 328. Similarly, the network resource 302 is permissioned to the friends subset 324 in namespace 306 via the sequence of namespace permissions 340 and 342.

Figure 6:
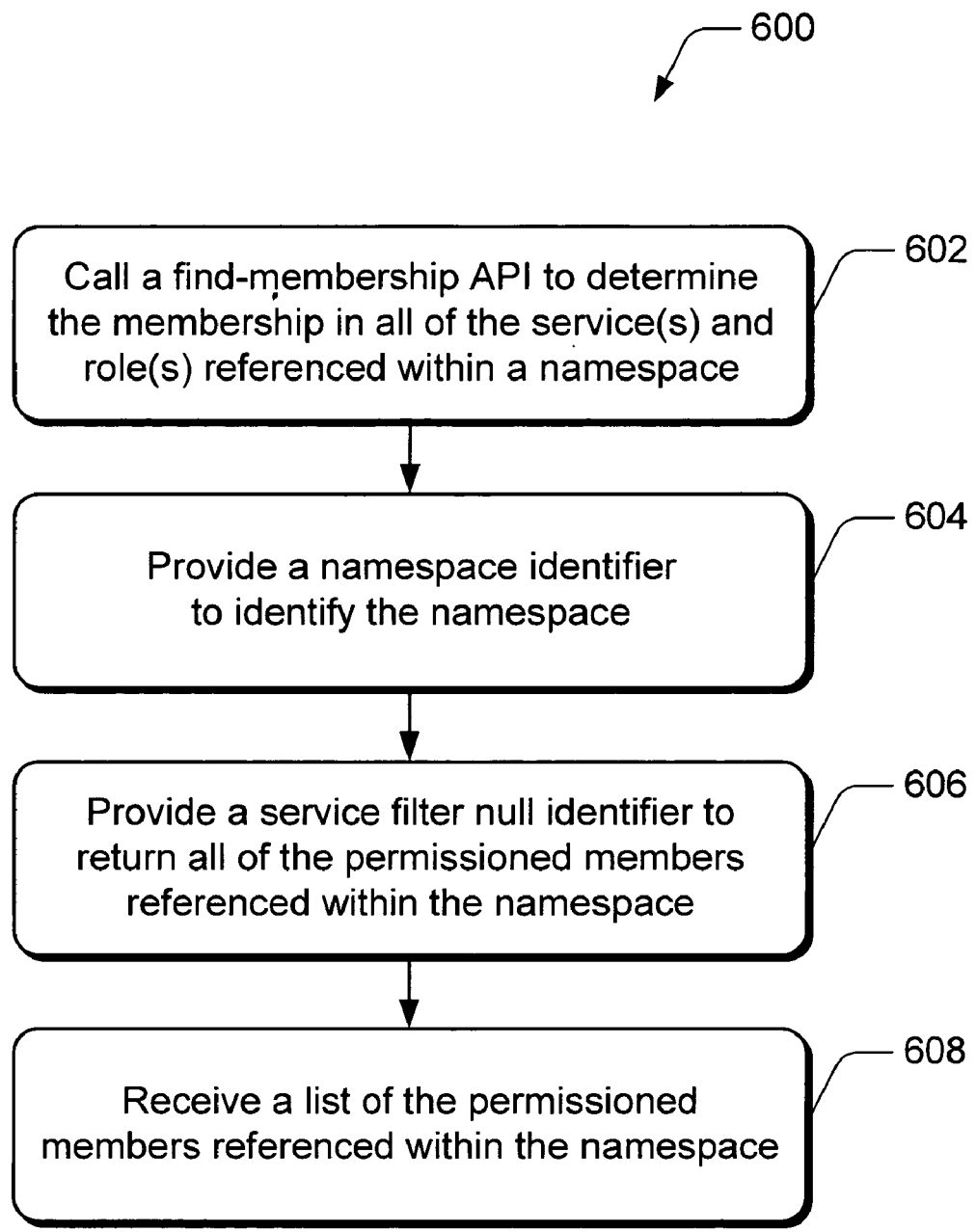
FIG. 6 is a flow diagram that illustrates an exemplary method for permissions using a namespace and is described with reference to determining the membership in all of the service(s) and role(s) that are permissioned within a namespace.

FIG. 6 illustrates an exemplary method 600 for permissions using a namespace, and is described with reference to determining the membership in all of the service(s) and role(s) that are permissioned within a namespace (e.g., a "find membership" API). The order in which the method is described is not intended to be construed as a limitation, and any number of the described method blocks can be combined in any order to implement the method. Furthermore, the method can be implemented in any suitable hardware, software, firmware, or combination thereof.

At block 602, a find-membership API (application program interface) is called to determine the membership in all of the service(s) and role(s) permissioned within a namespace. At block 604, a namespace identifier is provided to identify the namespace. At block 606, a service filter null identifier is provided to return all of the permissioned members referenced within the namespace. At block 608, a list of the permissioned members referenced within the namespace is received.

Figure 7:
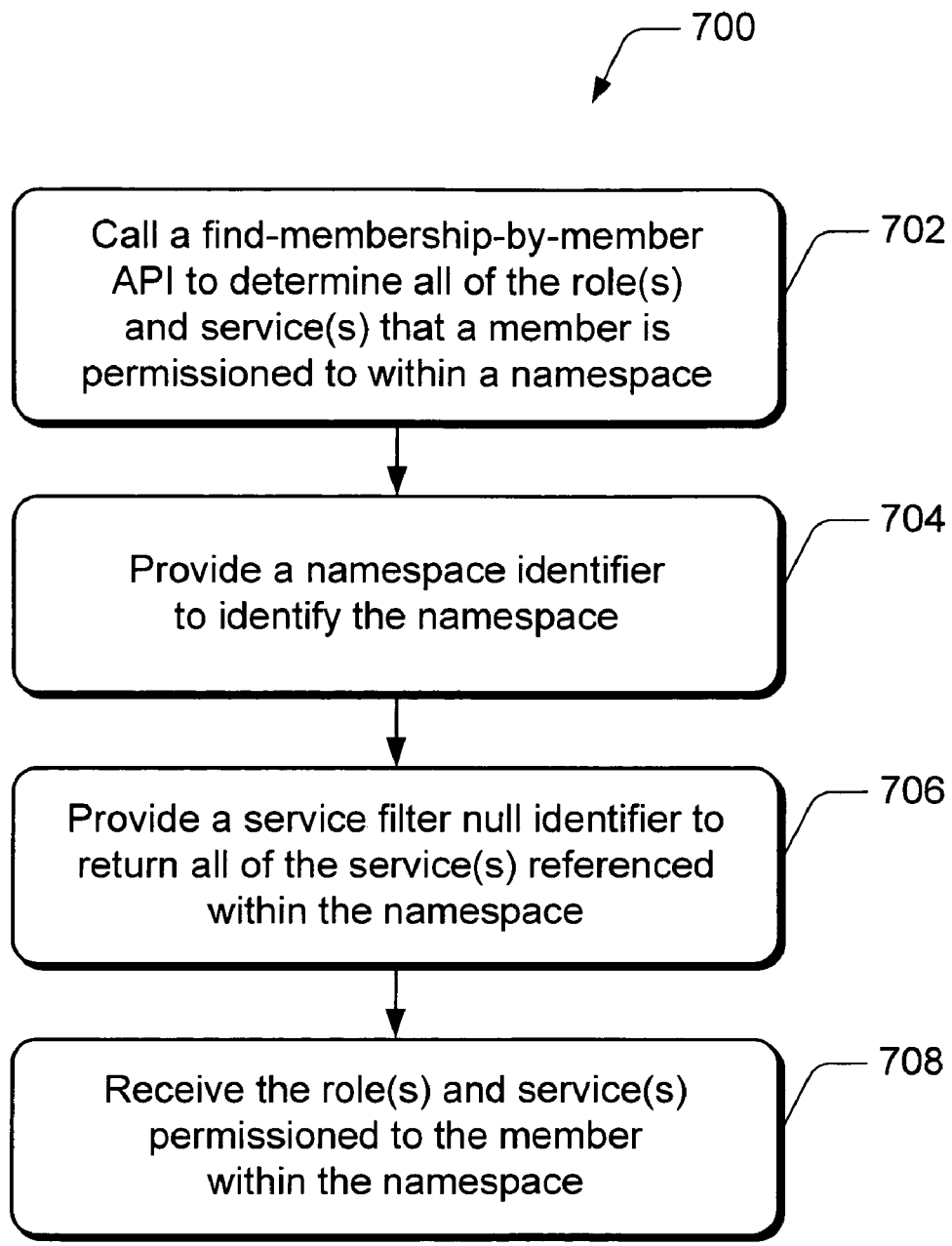
FIG. 7 is a flow diagram that illustrates an exemplary method for permissions using a namespace and is described with reference to determining all of the role(s) and service(s) that a member is permissioned to within a namespace.

FIG. 7 illustrates an exemplary method 700 for permissions using a namespace, and is described with reference to determining all of the role(s) and service(s) that a member is permissioned to within a namespace (e.g., a "find membership by member" API). The order in which the method is described is not intended to be construed as a limitation, and any number of the described method blocks can be combined in any order to implement the method. Furthermore, the method can be implemented in any suitable hardware, software, firmware, or combination thereof.

At block 702, a find-membership-by-member API (application program interface) is called to determine all of the role(s) and service(s) that a member is permissioned to within a namespace. At block 704, a namespace identifier is provided to identify the namespace. At block 706, a service filter null identifier is provided to return all of the service(s) referenced within the namespace. At block 708, the role(s) and service(s) permissioned to the member within the namespace are received.

Figure 8:
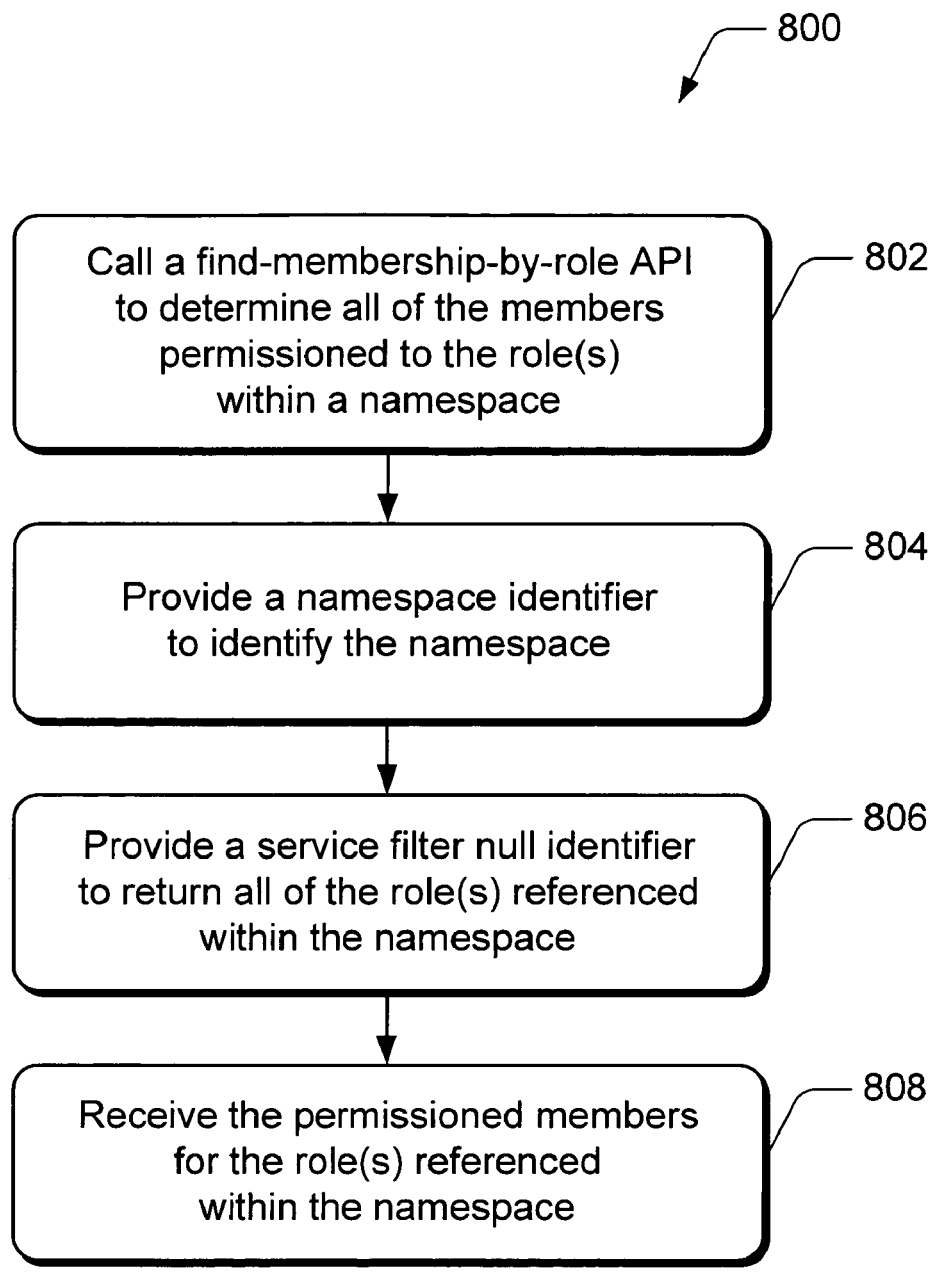
FIG. 8 is a flow diagram that illustrates an exemplary method for permissions using a namespace and is described with reference to determining all of the members permissioned to the role(s) in a namespace.

FIG. 8 illustrates an exemplary method 800 for permissions using a namespace, and is described with reference to determining all of the members permissioned to the role(s) in a namespace (e.g., a "find membership by role" API). The order in which the method is described is not intended to be construed as a limitation, and any number of the described method blocks can be combined in any order to implement the method. Furthermore, the method can be implemented in any suitable hardware, software, firmware, or combination thereof.

At block 802, a find-membership-by-role API (application program interface) is called to determine all of the members permissioned to the role(s) within a namespace. At block 804, a namespace identifier is provided to identify the namespace. At block 806, a service filter null identifier is provided to return all of the role(s) referenced within the namespace. At block 808, the permissioned members for the role(s) referenced within the namespace are received.

Figure 9:
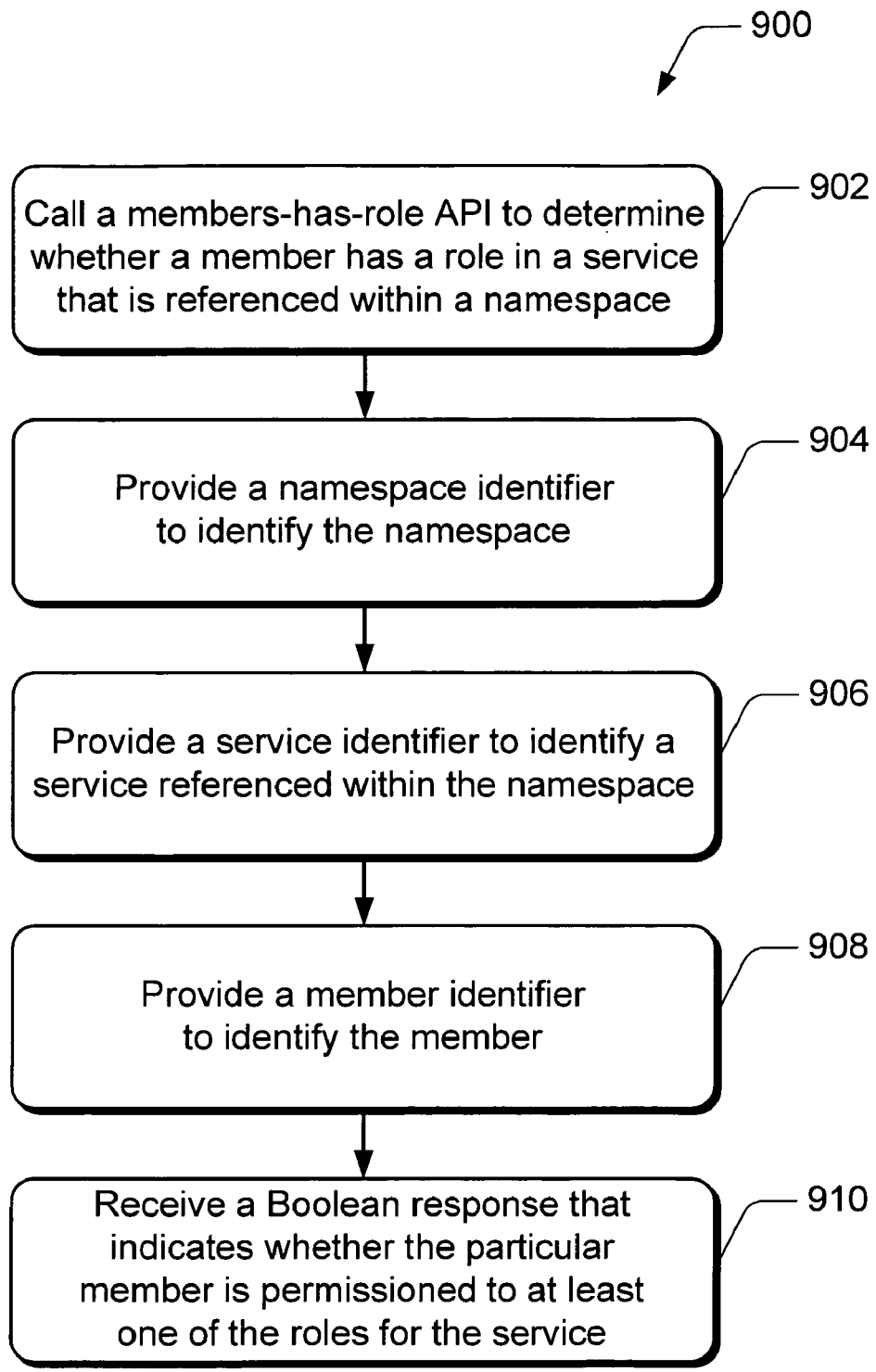
FIG. 9 is a flow diagram that illustrates an exemplary method for permissions using a namespace and is described with reference to determining whether a particular member has one of a given role in a service that is referenced within a namespace.

FIG. 9 illustrates an exemplary method 900 for permissions using a namespace, and is described with reference to determining whether a particular member has one of a given role in a service that is referenced within a namespace (e.g., a "members has role" API). The order in which the method is described is not intended to be construed as a limitation, and any number of the described method blocks can be combined in any order to implement the method. Furthermore, the method can be implemented in any suitable hardware, software, firmware, or combination thereof.

At block 902, a member-has-role API (application program interface) is called to determine whether a particular member has one of a given role in a service that is referenced within a namespace. At block 904, a namespace identifier is provided to identify the namespace. At block 906, a service identifier is provided to identify a service referenced within the namespace. At block 908, a member identifier is provided to identify the member. At block 910, a Boolean response is received that indicates whether the particular member is permissioned to at least one of the roles for the service. To resolve whether a particular member has a role on a service in a namespace, the resolution can begin at the point of access (i.e., the resource or service or role) and traverse the namespace permissions and references back to the member to determine if the member has access to the resource.

Figure 10:
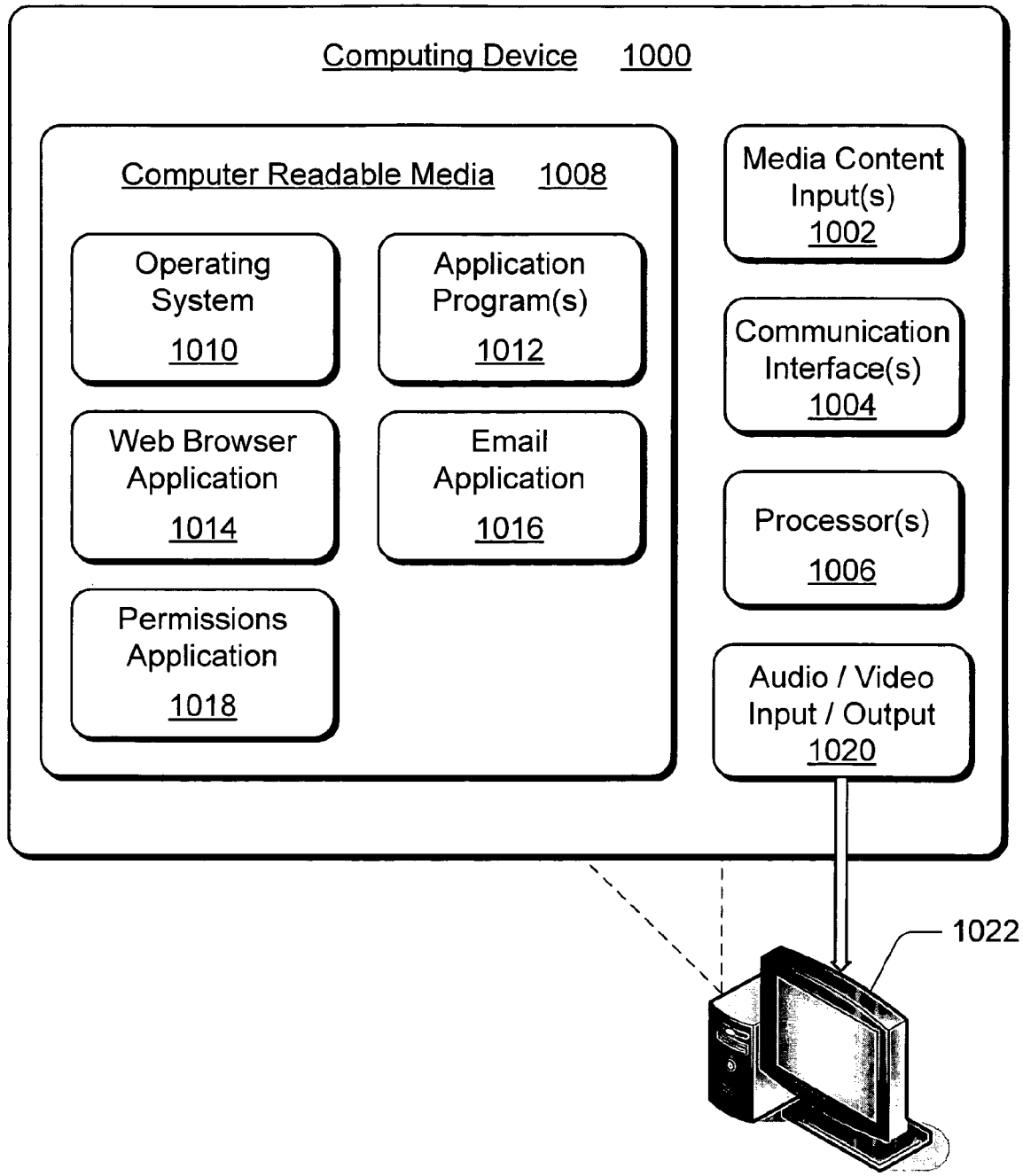
FIG. 10 illustrates various components of an exemplary computing device in which embodiments of permissions using a namespace can be implemented.

FIG. 10 illustrates various components of an exemplary computing device 1000 in which embodiments of permissions using a namespace can be implemented. For example, any one of client devices 104(1-N) and/or server devices 102 shown in FIG. 1 can be implemented as computing device 1000 in the network system 100. Computing device 1000 can also be implemented as any form of computing or electronic device with any number and combination of differing components as described below with reference to the exemplary computing environment 1100 shown in FIG. 11.

The computing device 1000 includes one or more media content inputs 1002 which may include an Internet Protocol (IP) input via which content is received via an IP-based network. Computing device 1000 further includes communication interface(s) 1004 which can be implemented as any one or more of a serial and/or parallel interface, a wireless interface, any type of network interface, and as any other type of communication interface. A wireless interface enables computing device 1000 to receive control input commands and other information from an input device, and a network interface provides a connection between computing device 1000 and a communication network (e.g., communication network 106 shown in FIG. 1) by which other electronic and computing devices can communicate data with computing device 1000.

Computing device 1000 also includes one or more processors 1006 (e.g., any of microprocessors, controllers, and the like) which process various computer executable instructions to control the operation of computing device 1000, to communicate with other electronic and computing devices, and to implement embodiments of permissions using a namespace. Computing device 1000 can be implemented with computer readable media 1008, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 1008 provides data storage mechanisms to store various information and/or data such as software applications and any other types of information and data related to operational aspects of computing device 1000. For example, an operating system 1010, various application programs 1012, a Web browser application 1014, and an email application 1016 can be maintained as software applications with the computer readable media 1008 and executed on processor(s) 1006.

In addition, the computer readable media 1008 can be utilized to maintain a permissions application 1018 to implement permissions using a namespace. Although the permissions application 1018 is illustrated and described as a single application configured to implement various embodiments of permissions using a namespace, the application 1018 can be implemented as several component applications distributed to each perform one or more functions in a computing device 1000.

Computing device 1000 also includes audio and/or video input/outputs 1020 that provide audio and/or video to an audio rendering and/or display device 1022, or to other devices that process, display, and/or otherwise render audio, video, and display data. Video signals and audio signals can be communicated from computing device 1000 to the display device 1022 via an RF (radio frequency) link, S-video link, composite video link, component video link, analog audio connection, or other similar communication links.

Although shown separately, some of the components of computing device 1000 may be implemented in an application specific integrated circuit (ASIC). Additionally, a system bus (not shown) typically connects the various components within computing device 1000. A system bus can be implemented as one or more of any of several types of bus structures, including a memory bus or memory controller, a peripheral bus, an accelerated graphics port, or a local bus using any of a variety of bus architectures.

Figure 11:
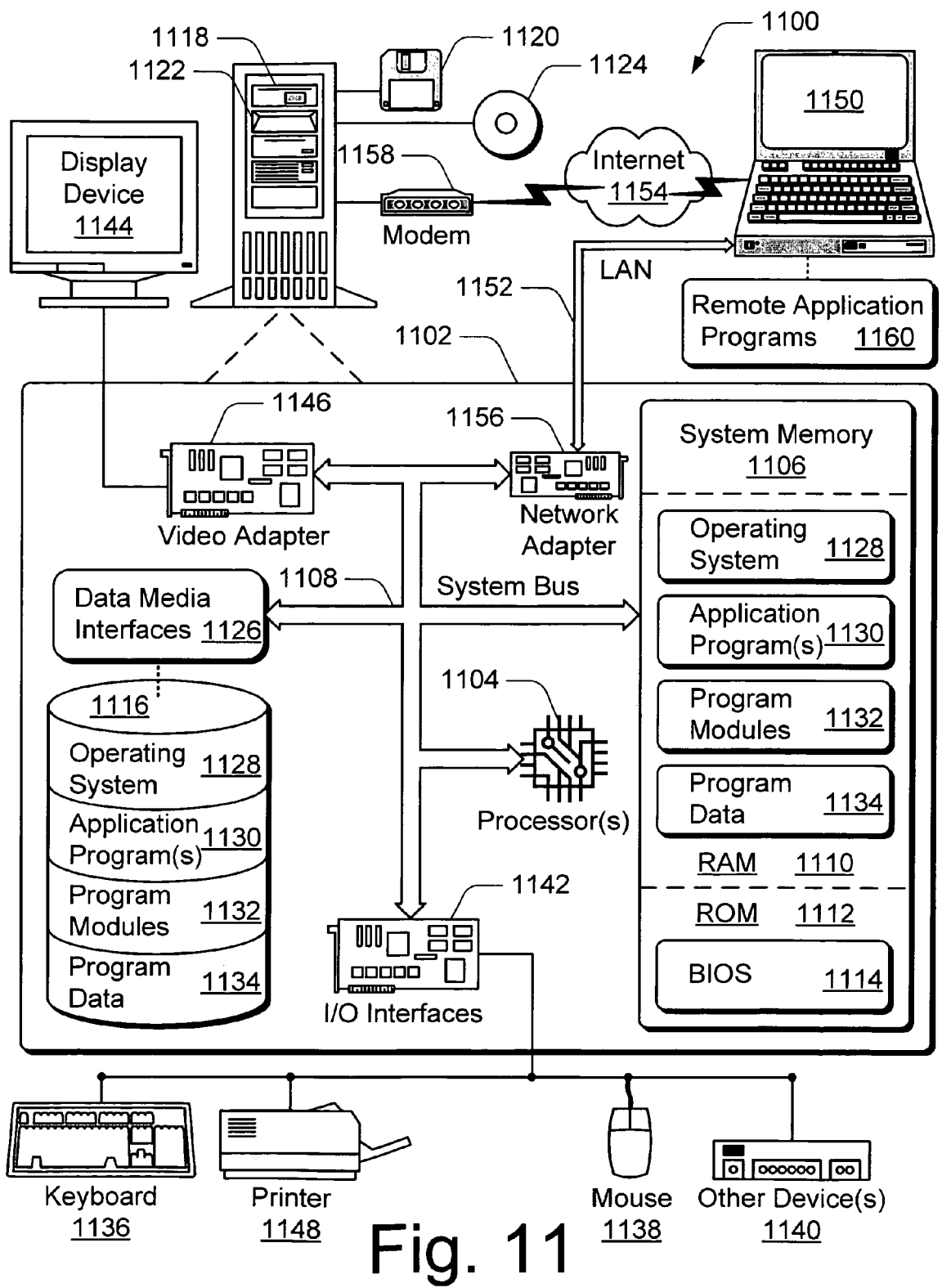
FIG. 11 illustrates exemplary computing systems, devices, and components in an environment that permissions using a namespace can be implemented.

FIG. 11 illustrates an exemplary computing environment 1100 within which systems and methods for permissions using a namespace, as well as the computing, network, and system architectures described herein, can be either fully or partially implemented. Exemplary computing environment 1100 is only one example of a computing system and is not intended to suggest any limitation as to the scope of use or functionality of the architectures. Neither should the computing environment 1100 be interpreted as having any dependency or requirement relating to any one or combination of components illustrated in the exemplary computing environment 1100.

The computer and network architectures in computing environment 1100 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1100 includes a general-purpose computing system in the form of a computing device 1102. The components of computing device 1102 can include, but are not limited to, one or more processors 1104

(e.g., any of microprocessors, controllers, and the like), a system memory 1106, and a system bus 1108 that couples the various system components. The one or more processors 1104 process various computer executable instructions to control the operation of computing device 1102 and to communicate with other electronic and computing devices. The system bus 1108 represents any number of several types of bus structures, including a memory bus or memory controller, a peripheral bus, an accelerated graphics port, and a processor or local bus using any of a variety of bus architectures.

Computing environment 1100 includes a variety of computer readable media which can be any media that is accessible by computing device 1102 and includes both volatile and non-volatile media, removable and non-removable media. The system memory 1106 includes computer readable media in the form of volatile memory, such as random access memory (RAM) 1110, and/or non-volatile memory, such as read only memory (ROM) 1112. A basic input/output system (BIOS) 1114 maintains the basic routines that facilitate information transfer between components within computing device 1102, such as during start-up, and is stored in ROM 1112. RAM 1110 typically contains data and/or program modules that are immediately accessible to and/or presently operated on by one or more of the processors 1104.

Computing device 1102 may include other removable/non-removable, volatile/non-volatile computer storage media. By way of example, a hard disk drive 1116 reads from and writes to a non-removable, non-volatile magnetic media (not shown), a magnetic disk drive 1118 reads from and writes to a removable, non-volatile magnetic disk 1120 (e.g., a "floppy disk"), and an optical disk drive 1122 reads from and/or writes to a removable, non-volatile optical disk 1124 such as a CD-ROM, digital versatile disk (DVD), or any other type of optical media. In this example, the hard disk drive 1116, magnetic disk drive 1118, and optical disk drive 1122 are each connected to the system bus 1108 by one or more data media interfaces 1126. The disk drives and associated computer readable media provide non-volatile storage of computer readable instructions, data structures, program modules, and other data for computing device 1102.

Any number of program modules can be stored on RAM 1110, ROM 1112, hard disk 1116, magnetic disk 1120, and/or optical disk 1124, including by way of example, an operating system 1128, one or more application programs 1130, other program modules 1132, and program data 1134. Each of such operating system 1128, application program(s) 1130, other program modules 1132, program data 1134, or any combination thereof, may include one or more embodiments of the systems and methods described herein.

A user can interface with computing device 1102 via any number of different input devices such as a keyboard 1136 and pointing device 1138 (e.g., a "mouse"). Other input devices 1140 (not shown specifically) may include a microphone, joystick, game pad, controller, satellite dish, serial port, scanner, and/or the like. These and other input devices are connected to the processors 1104 via input/output interfaces 1142 that are coupled to the system bus 1108, but may be connected by other interface and bus structures, such as a parallel port, game port, and/or a universal serial bus (USB).

A display device 1144 (or other type of monitor) can be connected to the system bus 1108 via an interface, such as a video adapter 1146. In addition to the display device 1144, other output peripheral devices can include components such as speakers (not shown) and a printer 1148 which can be connected to computing device 1102 via the input/output interfaces 1142.

Computing device 1102 can operate in a networked environment using logical connections to one or more remote computers, such as remote computing device 1150. By way of example, remote computing device 1150 can be a personal computer, portable computer, a server, a router, a network computer, a peer device or other common network node, and the like. The remote computing device 1150 is illustrated as a portable computer that can include any number and combination of the different components, elements, and features described herein relative to computing device 1102.

Logical connections between computing device 1102 and the remote computing device 1150 are depicted as a local area network (LAN) 1152 and a general wide area network (WAN) 1154. Such networking environments are commonplace in offices, enterprise-wide computer networks, intranets, and the Internet. When implemented in a LAN networking environment, the computing device 1102 is connected to a local network 1152 via a network interface or adapter 1156. When implemented in a WAN networking environment, the computing device 1102 typically includes a modem 1158 or other means for establishing communications over the wide area network 1154. The modem 1158 can be internal or external to computing device 1102, and can be connected to the system bus 1108 via the input/output interfaces 1142 or other appropriate mechanisms. The illustrated network connections are merely exemplary and other means of establishing communication link(s) between the computing devices 1102 and 1150 can be utilized.

In a networked environment, such as that illustrated with computing environment 1100, program modules depicted relative to the computing device 1102, or portions thereof, may be stored in a remote memory storage device. By way of example, remote application programs 1160 are maintained with a memory device of remote computing device 1150. For purposes of illustration, application programs and other executable program components, such as operating system 1128, are illustrated herein as discrete blocks, although it is recognized that such programs and components reside at various times in different storage components of the computing device 1102, and are executed by the one or more processors 1104 of the computing device 1102.

Although embodiments of permissions using a namespace have been described in language specific to structural features and/or methods, it is to be understood that the subject of the appended claims is not necessarily limited to the specific features or methods described. Rather, the specific features and methods are disclosed as exemplary implementations of permissions using a namespace.

The invention claimed is:

1. Computer-readable storage media comprising computer-executable instructions that, when executed, direct a computing-based device to establish a namespace by:
   establishing one or more members associated with the namespace;
   configuring a namespace permission that permissions access to a network resource for the one or more members of the namespace such that a member of the namespace can access the network resource; and
   configuring an inferred relationship that permissions access to the network resource to additional members of an additional namespace, the additional namespace being associated with a member of the namespace, the additional members not being associated directly with the namespace such that access to the network resource is not attainable by the additional members absent the inferred relationship, and the inferred relationship having a degree of separation which is equal to a number of inferred relationships used to permission the additional members to access the network resource.

2. Computer-readable storage media as recited in claim 1, wherein the inferred relationship further permissions access to the network resource to the additional members of one or more additional namespaces, the inferred relationship having a designated degree of separation to indicate a degree of the inferred relationship.

3. Computer-readable storage media as recited in claim 1, wherein the namespace permission further permissions the access to a role of the network resource for the one or more members of the namespace.

4. Computer-readable storage media as recited in claim 1, wherein the namespace permission further permissions the access to the network resource based on a permission level for one or more of the members of the namespace.

5. Computer-readable storage media as recited in claim 1, further comprising computer-executable instructions that, when executed, direct the computing-based device to further establish the namespace by permissioning a resource to the namespace, the resource including resource permissions and different resource permission levels, and wherein the namespace permission further permissions the access to the network resource for only one or more of the members that have permissioned access to the resource.

6. Computer-readable storage media as recited in claim 1, further comprising computer-executable instructions that, when executed, direct the computing-based device to further establish the namespace by configuring an additional namespace permission that permissions the additional members of the additional namespace for access to the network resource.

7. A method performed by a computer comprising:
configuring a namespace permission that permissions access to a network resource for one or more members associated with a namespace such that a member of the namespace can access the network resource; and configuring an inferred relationship that permission access to the network resource to additional members of an additional namespace, the additional namespace being associated with a member of the namespace, the additional members not being associated directly with the namespace such that access to the network resource is not attainable by the additional members absent the inferred relationship, and the inferred relationship having a degree of separation which is equal to a number of inferred relationships used to permission the additional members to access the network resource.

8. A method as recited in claim 7, wherein the inferred relationship further permissions access to the network resource to the additional members of one or more additional namespaces, the inferred relationship having a designated degree of separation to indicate a degree of the inferred relationship.

9. A method as recited in claim 7, wherein the namespace permission further permissions the access to a role of the network resource for the one or more members of the namespace.

10. A method as recited in claim 7, wherein the namespace permission further permissions the access to the network resource based on a permission level for one or more of the members of the namespace.

11. A method as recited in claim 7, further comprising further establishing the namespace by permissioning a resource to the namespace, the resource including resource permissions and different resource permission levels, and wherein the namespace permission further permissions the access to the network resource for only one or more of the members that have permissioned access to the resource.

12. A method as recited in claim 7, further comprising further establishing the namespace by configuring an additional namespace permission that permissions the additional members of the additional namespace for access to the network resource.

* * * * *